United States Patent
Harris

(10) Patent No.: US 6,318,019 B1
(45) Date of Patent: Nov. 20, 2001

(54) COMBINATION FISHING ROD SHEATH AND LURE ACCESSORY BAG

(76) Inventor: Charlotte Harris, 820 Parker St., Azle, TX (US) 76020

(*) Notice: Subject to any disclaimer, the term of this patent is extended or adjusted under 35 U.S.C. 154(b) by 0 days.

(21) Appl. No.: 09/487,157

(22) Filed: Jan. 19, 2000

(51) Int. Cl.⁷ .......................... A01K 97/08; A01K 97/06
(52) U.S. Cl. .................................. 43/26; 43/25.2
(58) Field of Search ................. 43/26, 25, 25.2, 43/21.2, 54.1; 206/315.11, 317; 224/922, 149, 901.2, 901.6; 42/96

(56) References Cited

U.S. PATENT DOCUMENTS

| | | | |
|---|---|---|---|
| Re. 32,752 | * | 9/1988 | Kiang ......................................... 42/96 |
| 4,136,478 | | 1/1979 | Wycosky ................................... 43/26 |
| 4,203,245 | * | 5/1980 | Peterson ................................. 43/25.2 |
| 4,530,178 | * | 7/1985 | Rauscher ................................... 43/26 |
| 4,641,454 | * | 2/1987 | Ray et al. ................................. 43/26 |
| 4,726,141 | | 2/1988 | McBride et al. ......................... 43/26 |
| 4,811,768 | * | 3/1989 | Williams ............................... 224/901.6 |
| 4,916,852 | | 4/1990 | Zebleckis ................................. 43/26 |
| 4,944,111 | * | 7/1990 | Daniel ................................... 43/25.2 |
| 4,966,320 | * | 10/1990 | DeSantis et al. ................. 224/901.6 |
| 4,967,504 | * | 11/1990 | Craft ........................................ 43/26 |
| 5,009,346 | * | 4/1991 | Butler .............................. 206/315.11 |
| 5,277,306 | * | 1/1994 | Sargent ........................... 206/315.11 |
| 5,327,669 | * | 7/1994 | Lannan et al. ........................... 43/26 |
| 5,417,354 | | 5/1995 | Jones ..................................... 224/613 |
| 5,450,957 | * | 9/1995 | Erb ................................... 206/315.11 |
| 5,505,014 | * | 4/1996 | Paullin ................................. 43/25.2 |
| 5,515,641 | | 5/1996 | D'Alessandro .......................... 43/26 |
| 5,588,245 | * | 12/1996 | Vance ................................... 43/25.3 |
| 5,957,284 | | 9/1999 | Caddell et al. ................. 206/315.11 |

* cited by examiner

*Primary Examiner*—Darren W. Ark
(74) *Attorney, Agent, or Firm*—Bracewell & Patterson, LLP

(57) ABSTRACT

A combination fishing rod sheath and lure accessory bag are shown. The sheath is formed of a pliable fabric material and has an initially open interior for receiving a shaft portion of a fishing rod. A wrap-around closure formed integrally with the sheath is used to secure the sheath about the rod. A lure accessory bag attaches to the rod handle on the side of the side opposite the reel. A rigged lure can be received within the accessory bag interior and retained in the interior by closing a mating hook and loop type engageable closure. By turning the lure handle to take up any slack, the closure can be used to keep the line taunt at all times.

8 Claims, 1 Drawing Sheet

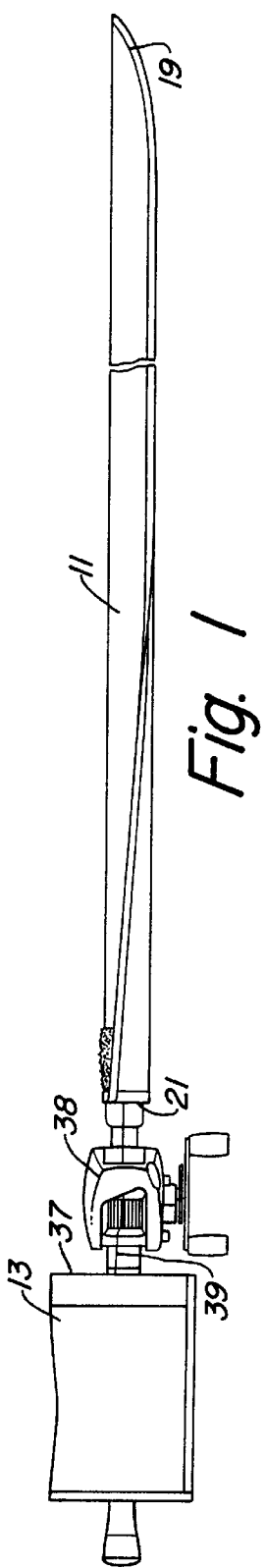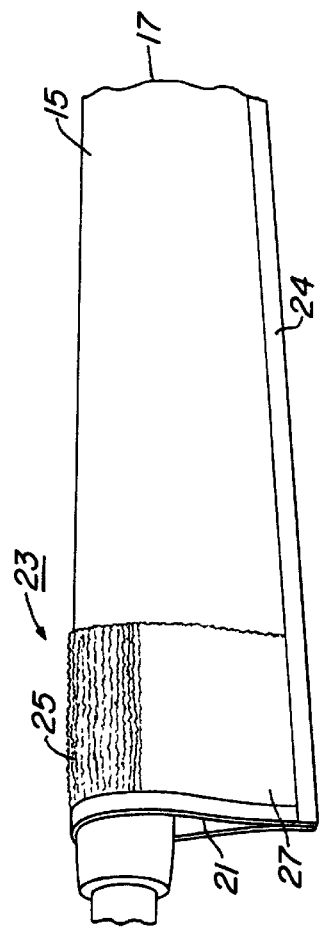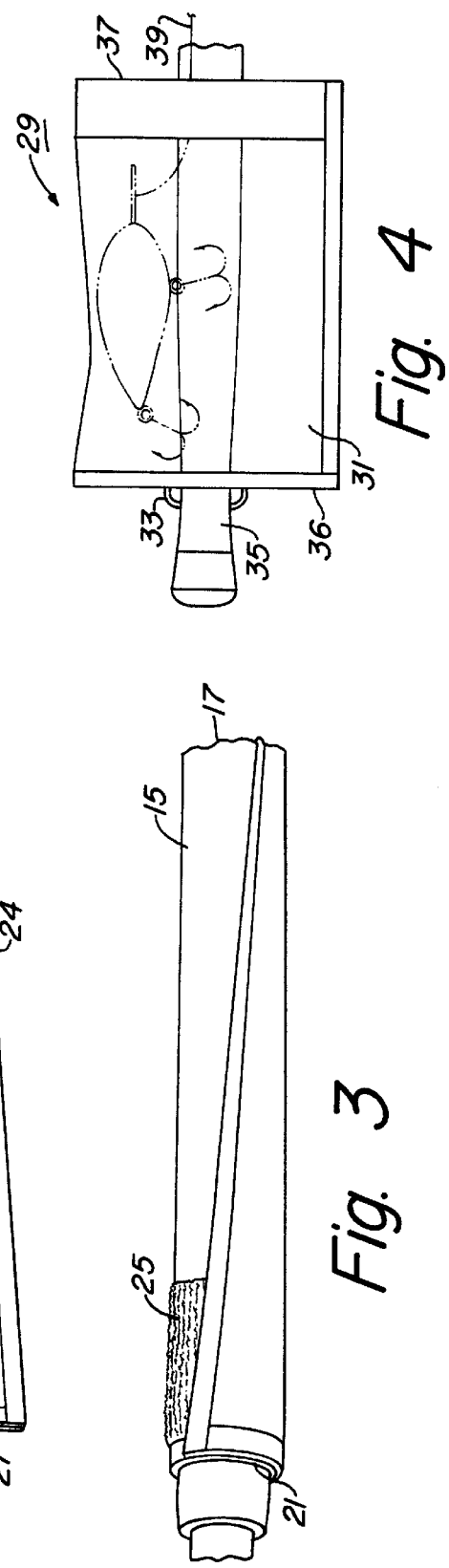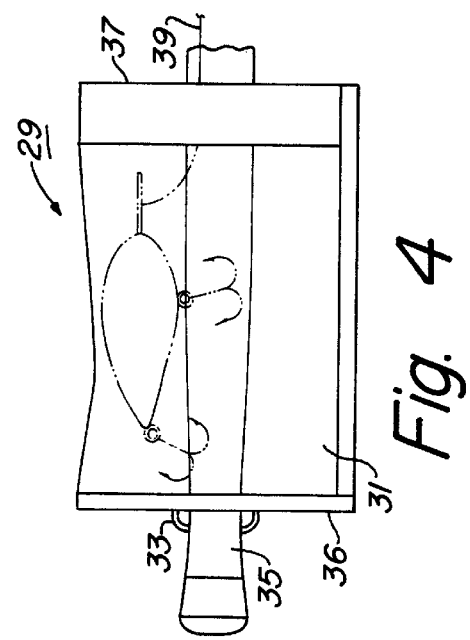

COMBINATION FISHING ROD SHEATH AND LURE ACCESSORY BAG

BACKGROUND ART

1. Field of the Invention

The present invention relates generally to fishing accessory devices for temporarily storing rods and lures and, more specifically, to such devices which will support competitive sport fishermen in the use of multiple, ready rigged rods in tournaments and the like.

2. Description of Related Art

Modem day fishermen often use a number of different rods and/or reels as well as a large variety of lures. These may be placed together in a convenient location in a boat for individual use when desired. It is preferable to keep the rods separate so as to avoid tangling hooks or lures and lines and to allow easy access to any given rod. It is also desirable to store the rods and reels in a fashion which allows easy retrieval for the next fishing trip without the risk of damage or tangling of lines, hooks and lures.

In the case of competitive sport fishing and tournaments, it is not uncommon for a single angler to use multiple rods during the course of a day's fishing or for two or more anglers to fish from a single boat with each using multiple rods. These situations create the possibility of entanglement of individual rods, an aggravating situation at best and a time wasting event during a competitive tournament. Whether one angler is on the boat or more than one angle share a boat, it is desirable to avoid tangling hooks and lines, especially during the stress of competitive tournaments.

Various solutions have been proposed for the problems of entanglement of this type. In some cases, multiple rods were stored in a locker box or in spaced mounts provided on the boat sidewalls. Individual rod cases were also sometimes used. Where individual rod cases were available, these tended to be designed as protective cases for shipping, carrying and storage, rather than for preventing entanglement in a rapid-use situation. Even if a locker box or spaced wall mounts were available, these devices were useful for storage but did not solve the problem of occasional entanglement.

Although the devices of the prior art have utility for their intended purposes, they have nevertheless failed to adequately satisfy the need for a widely accepted fishing rod sleeve which allows anglers to quickly switch rods in use during competitive fishing and which avoids entanglement of hooks, lines, lures and rod components.

A need exists, therefore, for a fishing rod sheath which is simple in design and economical to manufacture and which effectively avoids entanglement of hooks, lures and lines even in rapid-use situations.

A needs also exists for such a device which does not necessitate the use of locker boxes or mounts on the boat sidewalls but which is carried individually by the rod itself.

A need also exists for such a device which includes a combination lure accessory bag which allows storage of a rigged lure which is ready for use and yet which is isolated from the possibility of entanglement.

A need also exists for such a device which features a rod sheath and combination lure accessory bag which accessory bag is formed at least partly from a transparent synthetic material so that the stored lure is visible to the user.

SUMMARY OF THE INVENTION

The combination fishing rod sheath and lure accessory bag of the invention includes a tubular sheath having an exterior, an interior, a closed distal end and an initially open proximal end through which a fishing rod can be easily slid into the sheath interior. The sheath is preferably formed of a soft, pliable fabric material and is sized to be of a length which is substantially that of a shaft portion of a rod which is to be encased thereby. A wrap-around closure is provided for the initially open proximal end of the tubular sheath. Preferably, the wrap-around closure is an integral portion of the fabric material of the sheath.

A combination lure accessory bag is mountable upon a handle portion of the rod. The lure accessory bag has a mouth opening for receiving a lure rigged with the reel line on the rod. Preferably, the mouth opening of the lure accessory bag includes hook and loop type engageable fabric portions which serve to both close the mouth opening and hold a selected length of the reel line in a fixed position so that the line remains taunt with respect to the rigged reel and rod. Preferably, at least a portion of the lure accessory bag is formed of a transparent plastic type material, whereby a lure contained within the bag is visible to an angler with the lure in a stored position.

Additional objects, features and advantages will be apparent from the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 1 is a top, perspective view of the combination fishing rod and lure accessory bag of the invention in place on a fishing rod rigged with a reel;

FIG. 2 is an isolated view of a portion of the fishing rod sheath of FIG. 1 showing the proximal end opening thereof in the open position;

FIG. 3 is a view similar to FIG. 2 but showing the proximal end opening of the fishing rod sheath in the closed or secured position;

FIG. 4 is an isolated view of the lure accessory bag showing the retention of the lure line by the bag closure.

DETAILED DESCRIPTION OF THE PREFERRED EMBODIMENT

Referring to FIG. 1 of the drawings, there is shown a combination fishing rod sheath 11 and lure accessory bag 13 of the invention. As shown in FIGS. 1 and 2, the tubular sheath 11 has an exterior 15, an interior 17, a closed distal end 19 and an initially open proximal end 21 through which a fishing rod 23 can be slid into the sheath interior. The sheath 11 is preferably formed of a soft, pliable fabric and is sized to be of a length which is substantially that of a shaft portion of a rod which is to be encased thereby. Suitable materials would include synthetics such as nylon as well as cotton canvas and other natural or commercially available synthetic materials. As shown in FIG. 2, a sewn seam extends along the lower edge 24. The distal end 19, as shown in FIG. 1, tapers to a blade-shaped point in the preferred embodiment illustrated.

As best seen in FIGS. 2 and 3, the sheath 11 is provided with a wrap-around closure 23 for the initially open proximal end 21. Preferably, the wrap-around closure is formed as an integral part of the fabric material of the sheath. The wrap-around closure 23 is preferably formed by a patch of hook and loop type engageable material (such as portions 25, 27 in FIGS. 2 and 3) provided on an exterior surface of the sheath adjacent the initially open proximal end 21 thereof. In FIG. 2, the patch region 25 is the hook portion of material and the patch region 27 contains the loop type material. The wrap-around closure can be easily sewn or glued to the exterior of the sheath adjacent the proximal end opening 21. Suitable material is commercially available under the trademark "VELCRO" from a variety of commercial sources.

The combination device of the invention also includes a lure accessory bag (29 in FIG. 4) which includes at least a portion thereof formed from a heavy gauge synthetic material. Preferably, the material is a synthetic plastic type material, such as a suitable vinyl plastic. The synthetic plastic portion 31 is transparent so that a pre-rigged lure is easily visible without the necessity of opening the lure bag or of attaching a label to the bag exterior to identify the type lure present. Although a particular type lure is illustrated, the term "lure" will be understood to include crank baits, casting lures, jigs, worms, etc. The lure bag 29 has a VELCRO loop 33 attached thereto adjacent the closed end so that the bag 29 can be attached to the rod handle portion 35 below the reel (38 in FIG. 1).

The lure bag 29 has a mouth opening 37 at one end thereof which is formed by mating strips of VELCRO (top strip 38 being visible in FIG. 4). It will be appreciated from FIG. 4 that the VELCRO mouth opening 37 can be used to both close the mouth opening 37 and to hold a selected length of the reel line 39 in a fixed position so that the line 39 remains taut with respect to the rigged reel and rod. This action helps to keep the entire rigged reel in a taut condition, thereby lessening the possibility of tangling the line with other reels. The taut line 39 can be seen passing from the rod shaft portion over the reel 38 and to the lure bag 29 in FIG. 1. Any slack can be taken up by simply turning the reel handle with the safety actuated.

An invention has been provided with several advantages. The combination rod sheath and lure bag of the invention can be used for storing and using a plurality of fully rigged fishing rods, each comprising a rod, a reel and a fishing line carried between the reel and eyelets on a shaft portion of the rod. Each rod can be stored when not in use by sliding the shaft portion of the rod, exclusive of the reel, into the tubular sheath. Since the sheath is formed of a soft, pliable fabric material it can be easily folded up and stored until needed. The wrap-around closure is an economical means for closing the initially open proximal end of the sheath. Because the wrap-around closure is formed as an integral portion of the fabric material of the sheath there is no possibility that it will fall off or become lost. The combination lure bag is mountable upon a handle portion of the rod whereby a lure rigged with the reel line on the rod can be received within the bag. Because the bag mouth has a hook and loop type engageable portions, the portions can be used to both close the mouth opening and hold a selected length of the reel line in a fixed position so that the line remains taunt with respect to the rigged reel and rod. The transparent portion of the lure bag allows a user to immediately see what type lure is stored within the bag without the necessity of opening the bag. Because a heavy gauge vinyl plastic is used, the lure hooks do not tear or accidentally engage the bag sidewalls. The sheath and companion lure bag are simple in design and economical to manufacture from commercially available materials which are easily obtainable.

While the invention is shown in a limited number of forms, it is not limited to just these forms, but is susceptible to various changes and modifications without departing from the spirit thereof.

I claim:

1. A combination fishing rod sheath and lure accessory bag, the combination comprising:

a tubular sheath having an exterior, an interior, a closed distal end and an initially open proximal end through which a fishing rod can be easily slid into the sheath interior, the sheath being formed of a soft, pliable fabric material and being sized to be of a length which is substantially that of a shaft portion of a rod which is to be encased thereby;

a wrap-around closure for the initially open proximal end of the tubular sheath, the wrap-around closure being an integral portion of the fabric material of the sheath; and a lure accessory bag mountable upon a handle portion of the rod, the lure accessory bag having a mouth opening for receiving a lure rigged with a reel line on the rod; and wherein the sheath has a band with a band exposed area including both hook and loop engageable portions which are on and face outwardly from the sheath exterior adjacent the initially open proximal end, the hook engageable portion covering a portion of the band exposed area, the loop engageable portion covering a remaining portion of the band exposed area, the hook and loop portions abutting each other whereby folding the band exposed area upon itself engages the hook and loop engageable portions to form the wrap around closure.

2. The combination fishing rod sheath and lure accessory bag of claim 1, wherein the mouth opening of the lure accessory bag includes mouth region hook and loop engageable portions which serve to both close the mouth opening and hold a selected length of the reel line in a fixed position so that the line remains taunt with respect to the rigged reel and rod.

3. The combination fishing rod sheath and lure accessory bag of claim 2, wherein the lure accessory bag is formed of a transparent plastic material, whereby a lure contained within the bag is visible to an angler with the lure in a stored position.

4. The combination fishing rod sheath and lure accessory bag of claim 3, wherein the lure accessory bag is formed of a vinyl plastic.

5. A method of storing and using a plurality of fully rigged fishing rods, each comprising a rod, a reel and a fishing line carried between the reel and eyelets on a shaft portion of the rod, the method comprising the steps of:

providing a tubular sheath formed of a soft, pliable fabric material, the sheath having an initially open proximal end, an initially open interior and being sized to be of a length which is substantially that of the shaft portion of the rod which is to be encased thereby;

storing each rod when not in use by sliding the shaft portion of the rod, exclusive of the reel, into the initially open interior of the tubular sheath;

providing a wrap-around closure for the initially open proximal end of the tubular sheath, the wrap-around closure being integrally formed as a portion of the fabric material of the sheath;

providing a lure accessory bag mountable upon a handle portion of the rod on a side of the reel opposite the sheath, the lure accessory bag having a mouth opening for receiving a lure rigged with a reel line on the rod, the lure being placed within the lure accessory bag and the line pulled taunt; and wherein the sheath has a band with a band exposed area including both hook and loop engageable portions which are on and face outwardly from the sheath exterior adjacent the initially open proximal end, the hook engageable portion covering a portion of the band exposed area, the loop engageable portion covering a remaining portion of the band exposed area, the hook and loop portions abutting each other whereby folding the band exposed area upon itself engages the hook and loop engageable portions to form the wrap-around closure.

6. The method of claim 5, wherein the mouth opening of the lure accessory bag includes mouth region hook and loop engageable portions which serve to both close the mouth opening and hold a selected length of the reel line in a fixed position so that the line remains taunt with respect to the rigged reel and rod.

7. The method of claim 6, wherein the lure accessory bag is formed at least partly of a transparent synthetic plastic material so that the lure is visible when stored within the lure bag.

8. The method of claim 7, wherein any slack in the reel line between the lure and the reel is taken up by turning a reel handle with the line adjacent the lure being held securely by engagement with the mouth region hook and loop engageable portions of the mouth opening of the lure bag.

* * * * *